(12) United States Patent
Bapna et al.

(10) Patent No.: US 9,117,182 B2
(45) Date of Patent: Aug. 25, 2015

(54) METHOD AND SYSTEM FOR DYNAMIC TRAVEL PLAN MANAGEMENT

(71) Applicants: Anshuman Bapna, Bangalore (IN); Deep Singh, Bangalore (IN); Kadam Jeet Jain, Bangalore (IN)

(72) Inventors: Anshuman Bapna, Bangalore (IN); Deep Singh, Bangalore (IN); Kadam Jeet Jain, Bangalore (IN)

( * ) Notice: Subject to any disclaimer, the term of this patent is extended or adjusted under 35 U.S.C. 154(b) by 0 days.

(21) Appl. No.: 14/175,363

(22) Filed: Feb. 7, 2014

(65) Prior Publication Data

US 2014/0229102 A1 Aug. 14, 2014

(30) Foreign Application Priority Data

Feb. 14, 2013 (IN) .............................. 660/CHE/2013
Mar. 12, 2013 (IN) ............................ 1046/CHE/2013

(51) Int. Cl.
*G01C 21/34* (2006.01)
*G06Q 10/02* (2012.01)

(52) U.S. Cl.
CPC ............ *G06Q 10/025* (2013.01); *G01C 21/343* (2013.01)

(58) Field of Classification Search
None
See application file for complete search history.

(56) References Cited

U.S. PATENT DOCUMENTS

| | | | |
|---|---|---|---|
| 2002/0147541 A1* | 10/2002 | Trovato ......................... | 701/117 |
| 2003/0182052 A1* | 9/2003 | DeLorme et al. ............. | 701/201 |
| 2007/0106468 A1* | 5/2007 | Eichenbaum et al. ........ | 701/211 |
| 2009/0157312 A1* | 6/2009 | Black et al. ................... | 701/210 |
| 2009/0271104 A1* | 10/2009 | Letchner et al. .............. | 701/200 |
| 2011/0050732 A1* | 3/2011 | Arrasvuori .................... | 345/666 |
| 2011/0270517 A1* | 11/2011 | Benedetti ...................... | 701/201 |
| 2013/0179067 A1* | 7/2013 | Trowbridge et al. .......... | 701/410 |
| 2013/0238432 A1* | 9/2013 | Bai et al. .................... | 705/14.52 |
| 2014/0244110 A1* | 8/2014 | Tharaldson et al. ............ | 701/36 |

\* cited by examiner

*Primary Examiner* — Jonathan M Dager
(74) *Attorney, Agent, or Firm* — Barry Choobin; Patent360 LLC

(57) ABSTRACT

The various embodiments herein provide a method and system that provides curated, reliable information of destinations, information that is particularly relevant while planning a trip which travelers use to decide on what places to go and what activities to do. The system and method provides a preset itinerary of any place that is used or altered to their own liking using various tools and features. The system and method allows traveler/user to use itinerary from the social pool of the travel plans created by other users in the past. The system and method allows the traveler to change a set of preferences that govern the original plan and get a refreshed and up to the minute plan that contains a list of places in proximity to the current location.

14 Claims, 7 Drawing Sheets

METHOD AND SYSTEM FOR DYNAMIC TRAVEL PLAN MANAGEMENT

CROSS-REFERENCE TO RELATED APPLICATIONS

The embodiments herein claims the priority of the Indian Provisional Patent Application with serial number No. 660/CHE/2013 filed on Feb. 14, 2013 having the title "Method and System for Automated Extraction of Structured Travel Related Data for Trip-Planning", and the Indian Provisional Patent Application with serial number No. 1046/CHE/2013 filed on Mar. 12, 2013 having the title "Method and System for Creating and Updating Travel Plans Automatically for Mobile Devices". The contents of both the abovementioned Indian Provisional Patent Applications are incorporated by entirety as reference herein.

BACKGROUND

1. Technical Field

The embodiments herein generally relates to a method and system for creating a plausible, minute-by-minute plan for a traveler and particularly relates to extracting texts from relevant HTML pages, processing them and outputting a time ordered list of places to visit. The embodiments herein more particularly relates to a method and system for dynamic travel plan management by automatically creating travel plans based on a user location and choice of interesting places of the user.

2. Description of the Related Art

The travel planning involves various stages such as exploration and identifying destinations that are of interest, booking the necessary tickets for transport or accommodation and creating a detailed plan for the entire duration of the trip.

When planning a trip, the travelers often seek/search out what the other travelers to the same destination have done in the past. One of the key pieces of information they seek is the trip plans, or travel itineraries. An itinerary from another traveler who had similar constraints (number of days, attractions to be visited, co-travelers, etc) as them can be of a big help in speeding up/expediting the planning process.

Currently, the travelers need to search through a dozens of different websites, blogs, travel forums and online magazines (collectively, "unstructured web pages") to achieve this. In all, there might be thousands of web pages that describe the trips taken by the travelers in the past for each destination. This massive dispersion/distribution of information is one of the main reasons why a travel planning at present can take as much as 6-8 weeks.

This massive dispersion/distribution of information also causes other issues such as cataloging and referencing for later use. As there are so many sources, a traveler often has to resort to the complicated ways in keeping track of places of attractions to visit, events to attend, places to eat and to budget for each accordingly.

There are various services and websites that do solve this problem somewhat by providing a large cache of such information in one single place, but they fall short of providing a seamless experience to the travelers willing or desirous to construct a whole individual plan of their choice. A plan is intrinsically more than just a collection of places to visit or a list of restaurants for eating. It is valuable and useful only if the travel plan can incorporate the elements like transit modes and options, routing and order in which the places to be visited. Perhaps most important of all is that a plan needs to exist as a cohesive, "single" unit that is accessible at all times.

In view of the foregoing, there is a need for a method and system that allows the travelers to plan ones trip in the best possible manner. There is also a need for a method and system in which the massive information distribution problem is solved to a greater degree, making a plan easier and accessible to all as seamless as possible. Further there is a need for a method and system to provide curated, reliable information of different destinations for planning a trip. Still further there is a need for a method and system for rendering easier and portable spreadsheets for listing places to be visited, restaurants for eating and managing travel time on trips. Yet further there is a need for a method and system for formulating a travel plan in near real time based on the received inputs from a traveler to optimize his/her travel plan for that day.

The above mentioned shortcomings, disadvantages and problems are addressed herein and which will be understood by reading and studying the following specification.

OBJECTS OF THE EMBODIMENTS

The primary object of the embodiments herein is to provide a method and system that allows a traveler to plan his/her trips in the best possible way by providing the relevant information as well as the means to use that information while drafting the trip-plan.

Another object of the embodiments herein is to provide a method and system for automatically converting the unstructured data related to travel and trip planning to concise, structured itineraries that are easily read and followed.

Yet another object of the embodiments herein is to provide curated, reliable information of different destinations for planning a trip.

Yet another object of the embodiments herein is to provide recommendations in the form of suggestions about various destinations to guide the traveler for planning a trip.

Yet another object of the embodiments herein is to provide a mobile interface to enter the preferences related to a plan; view, edit/modify and delete a travel itinerary.

Yet another object of the embodiments herein is to provide a method and system to publish the new itineraries using the data collected from the mobile devices carried by the travelers during the trips.

Yet another object of the embodiments herein is to provide a method and system for automatically plotting a set of places to be visited in a right/correct and appropriate order with an optimal use of time available.

Yet another object of the embodiments herein is to provide a method and system for recording the places visited already in a trip or a day using a GPS enabled mobile device.

Yet another object of the embodiments herein is to provide a method and system for providing a dynamic travel plan of a day by suggesting an alternate list of places to be visited in near real time based on a stored and recorded places visited already.

These and other objects and advantages of the embodiments will become readily apparent from the following detailed description taken in conjunction with the accompanying drawings.

SUMMARY

The various embodiments herein provide a method and system that allows a traveler to plan his/her trips in the best possible way by providing the relevant information as well as the means to use that information while drafting a travel plan. The method and system provides curated and reliable information of destinations that is particularly relevant while planning a trip. The travelers use the curated and reliable information to select the places of visit and the activities to be carried out. The method and system also provides a preset itinerary of any place that is used or altered to their own liking using the various tools and features. The method and system further allows a traveler/user to use an itinerary from the social pool of the travel plans created by other users in the past.

According to an embodiment herein, a system is provided for dynamic travel plan management. The system comprises a point of travel interest database storing travel related plain text articles extracted from a plurality of sources, an article extraction module for extracting a plurality of articles by using a combination of word exclusion lists and heuristics identified in text entities, a place verification module for verifying a geographical location of a plurality of places of visit included in the extracted plurality of articles, an application server for generating a travel plan using a web portal or a mobile application based on a set of preferences set by the user, and a user device pre-installed with a mobile application.

According to an embodiment herein, the point of travel interest database stores a travel related plain text articles extracted from a plurality of sources, and wherein the plurality of sources is selected from a group consisting of web portals, social networking websites and tourism sites, and wherein the travel related plain text articles are transformed into a time ordered list of places to be visited and stored in the point of travel interest database.

According to an embodiment herein, an article extraction module is provided for extracting a plurality of articles by using a combination of word exclusion lists and heuristics identified in text entities.

According to an embodiment herein, a place verification module is provided for verifying a geographical location of a plurality of places of visit included in the extracted plurality of articles and wherein the plurality of places of visit are included in an travel plan, by using a combination of word exclusion lists and the travel related plain text articles in the point of travel interest database.

According to an embodiment herein, an application server is provided for generating a travel plan using a web portal or a mobile application based on a set of preferences set by the user, and wherein the travel plan is to be followed and executed by a user.

According to an embodiment herein, a user device is pre-installed with a mobile application, and wherein the user mobile device is connected to the application server to download the generated travel plan, and wherein the generated travel plans is to be followed or wherein the generated ravel is modified for further use.

According to an embodiment herein, the user device is a computing device selected from a group consisting of a desktop computer, a laptop computer, a palm top computer, a GPS enabled mobile phone device, and a tablet device.

According to an embodiment herein, the system further comprises a preference storage module for storing the set of preferences set by the user, and wherein the set of preferences comprises number of days, intensity of activities, and a preferred set of places to be visited, and wherein the preferred set of places to be visited is collected from the user.

According to an embodiment herein, the application server comprises a plan calculation module for calculating a travel plan based on the set of preferences set by the user.

According to an embodiment herein, wherein the application server receives data from the article extraction module and the place verification module for constructing the travel plan.

According to an embodiment herein, the mobile application installed in the user mobile device is run to retrieve and record a location of the user and co-ordinates of the location of the user in real time by using an inbuilt GPS chip in the user mobile device, and wherein the mobile application is run to transmit the recorded location of the user and the co-ordinates of the location of the user to the application server for calculating a deviation from the downloaded travel plan.

According to an embodiment herein, the application server modifies the generated plan to generate a revised travel plan based on the location of the user and co-ordinates of the location, when the deviation from the generated travel plan is detected.

According to an embodiment herein, a method is provided for dynamic travel plan management. The method comprises extracting one or more travel related plain text articles from one or more web portals; storing the extracted one or more travel related plain text articles in a point of travel interest database; receiving a set of preferences from an user and storing the set of preferences in a preference storage module; extracting a plurality of articles from the travel related plain text articles by using a combination of word exclusion lists and heuristics identified in text entities; verifying the extracted plurality of articles with respect to one or more places of visit to be included in a travel plan; generating a travel plan using a web portal or an application provided in user mobile device based on the set of preferences received from the user and the one or more place of visit, and wherein the generated travel plan is to be followed and executed by the user; and downloading the generated travel plan to the user mobile device pre-installed with a mobile application.

According to an embodiment herein, the method further comprises choosing a number of places to be visited in a day by the application server.

According to an embodiment herein, each chosen place is assigned with a rank of priority for a final selection and sorting.

According to an embodiment herein, the method further comprises identifying a preset period of day and slots in the travel plan for visiting a specific type of places, and wherein the slots for visiting the preset types of places are identified and selected based on a proximity of the preset type of places with the number of places of visit selected for visiting in a given day.

According to an embodiment herein, the method further comprises checking the places to be visited in a single day or the given day based on the rank assigned to the set of places, distance of places with respect to the selected places of visit in the given day and a transit time between any two places of visit to generate a travel plan by the application server.

According to an embodiment herein, the user modifies the generated and downloaded travel plan by selecting a fresh set of preferences and options, based on actual places visited and a remaining time and places to be visited in the given day.

According to an embodiment herein, the application server modifies the generated travel plan to generate a revised travel plan to include new places of visit based on the present location of the user and a proximity of new places not visited and not included in the downloaded travel plan, and wherein the revised travel plan is downloaded to the user mobile device in real time.

According to an embodiment herein, the system for allowing a traveler to plan his/her trips in the best possible way comprises a point of interest database, an application server, an article extraction module, a place verification module and a user device.

According to an embodiment herein, the user device is any of a computing device selected from a group consisting of a desktop computer, a laptop, a palm top, a GPS enabled mobile phone, and a tablet.

According to an embodiment herein, the user device is connected to the application server to request an itinerary that is consumed as is or modified for further use. Further, the user downloads a plan that has been calculated based on a set of preferences exercised by the user.

According to another embodiment herein, the set of preferences comprises a number of days, intensity of activities, and a preferred set of places to visit is collected from the user.

According to another embodiment herein, the article extraction module extracts a plurality of articles by using a combination of word exclusion lists and heuristics identified in the text entities and wherein the text entities includes famous monuments and attractions, restaurants, bars and pubs, night clubs and museums.

According to an embodiment herein, the identified text is fed to a place verification module. Further the place verification module verifies the extracted word to be a useful entity to be included in an itinerary, by using a combination of its own exclusion lists and a geographical places database.

According to an embodiment herein, the application server after receiving the data from the article extraction module and the places verification module constructs an itinerary that is followed by a traveler using a web portal or a mobile application.

According to an embodiment herein, the itinerary is downloaded to the user's choice of mobile device and carried on a trip.

According to an embodiment herein, as the user travels, the downloaded itinerary records the traveler's location by using an inbuilt GPS chip in the user's mobile device. This location is transmitted back to the application server which calculates deviation from the original downloaded itinerary. If the deviation is found to be useful, a new itinerary based on the collected co-ordinates is constructed.

The various embodiments herein provide a method and system for creating a plausible, minute by minute plan for a traveler automatically and instantaneously. The method and system provides a plan that optimizes the travel routes and provides for maximum benefit when visiting a series of places. The method and system also allows the traveler to change a set of preferences that govern the original plan and get a refreshed and up to the minute plan that contains a list of places in proximity to the current location.

According to an embodiment herein, the system for allowing a traveler to get a plausible and up to the minute accurate list of places to visit comprises a point of interest database, a database of stored traveler preferences, a plan calculation service, and a user device.

According to an embodiment herein, the density of places to visit in a day is assessed.

According to an embodiment herein, each of the places chosen is assigned a rank of priority for eventual choosing and sorting.

According to an embodiment herein, certain times of day and slots are identified to be filled with only very specific types of places.

According to an embodiment herein, multiple passes are carried out over the data to calculate a rough schedule. These passes take inputs from previous steps including but not limited to the ranked set of places, range of places and transit time between any random pair of places. These passes roughly follow the same method of calculation as the problem of travelling salesman with time windows does.

According to an embodiment herein, plans that have scored the highest in terms of the least distance travelled with the ability to fit the highest ranked places are chosen for refinement and presentation.

According to an embodiment herein, the slots that need to be pre-filled with specific types of places are filled based on proximity to other places of visit.

According to an embodiment herein, the traveler is allowed to modify an existing plan by selecting a fresh set of preferences and options.

According to an embodiment herein, the plan is recalculated based on the present location of traveler and proximity of places not included in the original plan but now can be visited because of changed preferences.

According to an embodiment herein, this recalculated plan is downloaded immediately to the user's mobile device.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
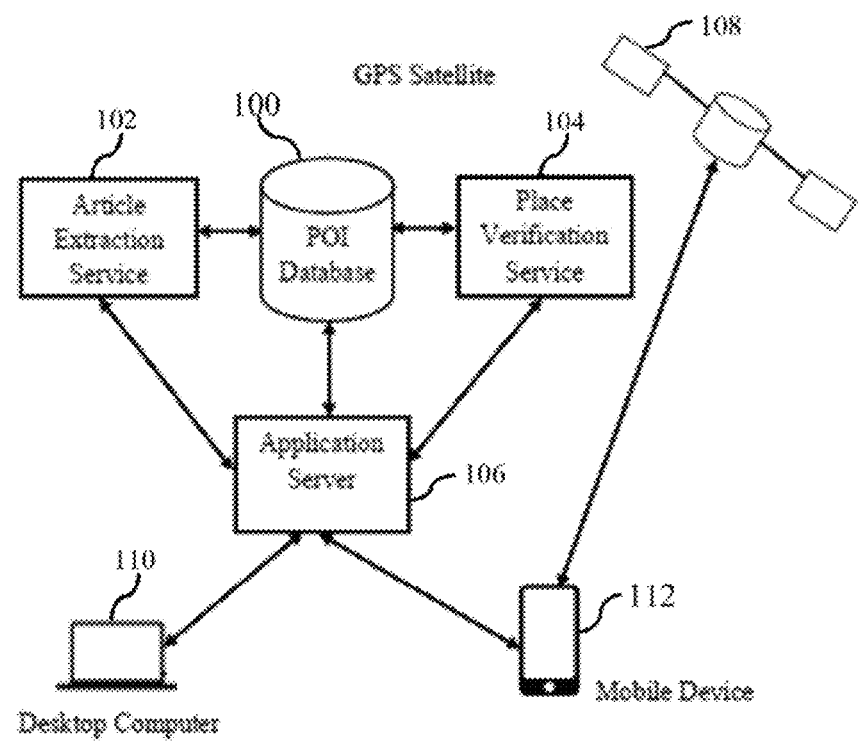
FIG. 1 illustrates a block diagram of the system for constructing a structured itinerary from a variety of unstructured, free text sources and delivering to a user, according to an embodiment herein.

Although the specific features of the present invention are shown in some drawings and not in others. This is done for convenience only as each feature may be combined with any or all of the other features in accordance with the present invention.

DETAILED DESCRIPTION OF THE EMBODIMENTS

In the following detailed description, reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a method and system that allows a traveler to plan his/her trips in the best possible way by providing the relevant information as well as the means to use that information while drafting a travel plan. The method and system provides curated and reliable information of destinations that is particularly relevant while planning a trip. The travelers use curated and reliable information to select the places of visit and the activities to be carried out. The method and system also provides a preset itinerary of any place that is used or altered to their own liking using the various tools and features. The method and system further allows a traveler/user to use an itinerary from the social pool of the travel plans created by other users in the past.

According to an embodiment herein, the system for allowing a traveler to plan his/her trips in the best possible way comprises a point of interest database, an application server, an article extraction module, a place verification module and a user device.

According to an embodiment herein, the user device is any of a computing device selected from a group consisting of a desktop computer, a laptop, a palm top, a GPS enabled mobile phone, and a tablet.

According to an embodiment herein, the user device is connected to the application server to request an itinerary that is consumed as is or modified for further use. Further, the user downloads a plan that has been calculated based on a set of preferences exercised by the user.

According to another embodiment herein, the set of preferences comprises a number of days, intensity of activities, and a preferred set of places to visit is collected from the user.

According to another embodiment herein, the article extraction module extracts a plurality of articles by using a combination of word exclusion lists and heuristics identified in the text entities and wherein the text entities includes famous monuments and attractions, restaurants, bars and pubs, night clubs and museums.

According to an embodiment herein, the identified text is fed to a place verification module. Further the place verification module verifies the extracted word to be a useful entity to be included in an itinerary, by using a combination of its own exclusion lists and a geographical places database.

According to an embodiment herein, the application server after receiving the data from the article extraction module and the places verification module constructs an itinerary that is followed by a traveler using a web portal or a mobile application.

According to an embodiment herein, the itinerary is downloaded to the user's choice of mobile device and carried on a trip.

According to an embodiment herein, as the user travels, the downloaded itinerary records the traveler's location by using an inbuilt GPS chip in the user's mobile device. This location is transmitted back to the application server which calculates deviation from the original downloaded itinerary. If the deviation is found to be useful, a new itinerary based on the collected co-ordinates is constructed.

The various embodiments herein provide a method and system for creating a plausible, minute by minute plan for a traveler automatically and instantaneously. The method and system provides a plan that optimizes the travel routes and provides for maximum benefit when visiting a series of places. The method and system also allows the traveler to change a set of preferences that govern the original plan and get a refreshed and up to the minute plan that contains a list of places in proximity to the current location.

According to an embodiment herein, the system for allowing a traveler to get a plausible and up to the minute accurate list of places to visit comprises a point of interest database, a database of stored traveler preferences, a plan calculation service, and a user device.

According to an embodiment herein, the density of places to visit in a day is assessed.

According to an embodiment herein, each of the places chosen is assigned a rank of priority for eventual choosing and sorting.

According to an embodiment herein, certain times of day and slots are identified to be filled with only very specific types of places.

According to an embodiment herein, multiple passes are carried out over the data to calculate a rough schedule. These passes take inputs from previous steps including but not limited to the ranked set of places, range of places and transit time between any random pair of places. These passes roughly follow the same method of calculation as the problem of travelling salesman with time windows does.

According to an embodiment herein, plans that have scored the highest in terms of the least distance travelled with the ability to fit the highest ranked places is chosen for refinement and presentation.

According to an embodiment herein, the slots that need to be pre-filled with specific types of places are filled based on proximity to other places of visit.

According to an embodiment herein, the traveler is allowed to modify an existing plan by selecting a fresh set of preferences and options.

According to an embodiment herein, the plan is recalculated based on the present location of traveler and proximity of places not included in the original plan but now can be visited because of changed preferences.

According to an embodiment herein, this recalculated plan is downloaded immediately to the user's mobile device.

FIG. 1 illustrates a block diagram of the system for constructing a structured itinerary from a variety of unstructured, free text sources and delivering to a user, according to an embodiment herein. The system comprises an application server 106, article extraction service module 102, POI database 100, place verification service module 104, GPS satellite 108, desktop computer 110 and mobile device 112 as shown in FIG. 1. The system provides a user interface for a user by way of a desktop computer 110 or a fully mobile communication device like a smart phone or tablet 112. When a traveler using the service/system, requests a trip plan, the application server 106 serves up the desired plan. The application server 106, as a prior task, asynchronously has consolidated the plan, with the help of an article extraction service module 102, a Places of Interest (POI) database 100 and a place verifications service module 104.

According to an embodiment herein, once a desired plan has been made, the traveler accesses and downloads it to his/her preferred viewing device such as desktop computer 110 or a smart phone or tablet 112. During the trip, if the traveler accesses the plan by way of a mobile communication device 112, the system automatically detect the location of the traveler, using the GPS functionality provided in the user mobile device. If the traveler follows the path and visits the places exactly as disclosed in the plan, the coordinates of the locations visited is transmitted back to the server and the plan is validated. If however, the traveler deviates from the downloaded plan and visits the places not listed in the downloaded plan, data about such places is transmitted back to the system using GPS functionality provided in the user mobile device 112. Since the transmitted data is not part of a stored plan, it effectively forms the basis of a new plan in combination with the already visited, pre-planned places. The system now generates a new plan accordingly and stores it in the POI database 100. This new plan can now be retrieved, modified and accessed like any other on the desktop computer 110 or smart phone or tablet 112.

Figure 2A:
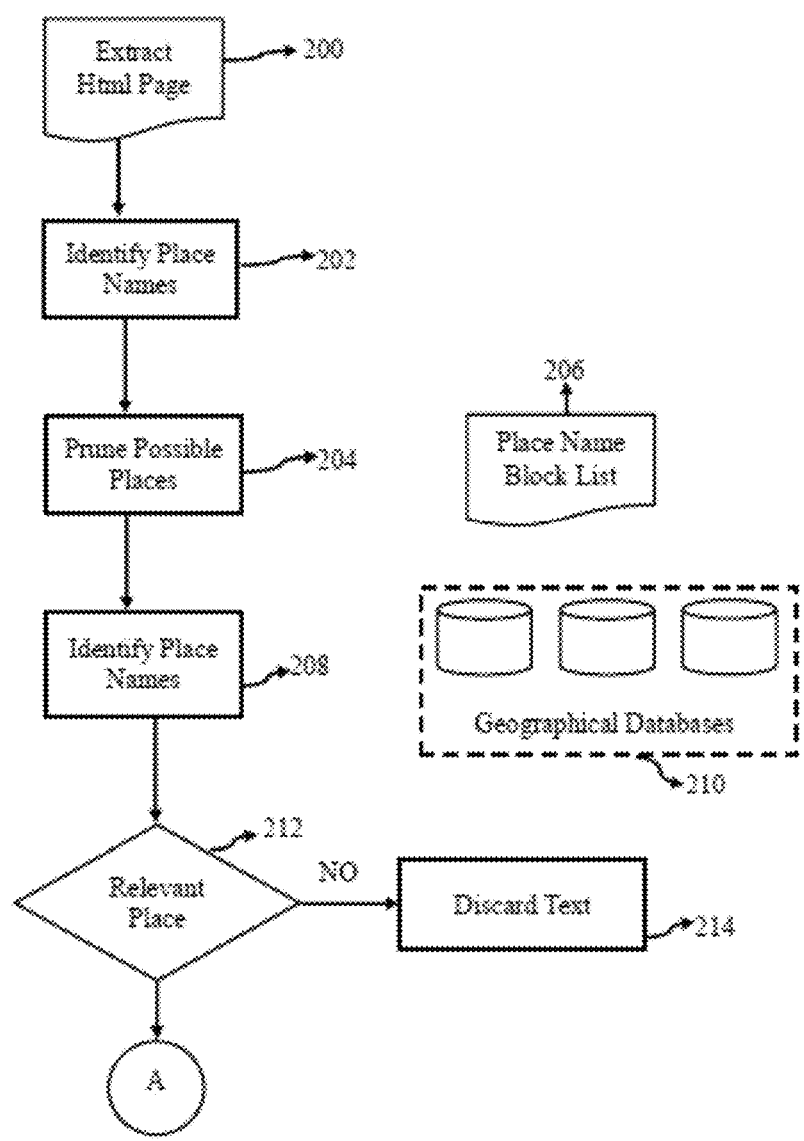
FIG. 2A and FIG. 2B jointly illustrates a flowchart explaining a method of extracting relevant travel related data from a web page, according to an embodiment herein.
Figure 2B:
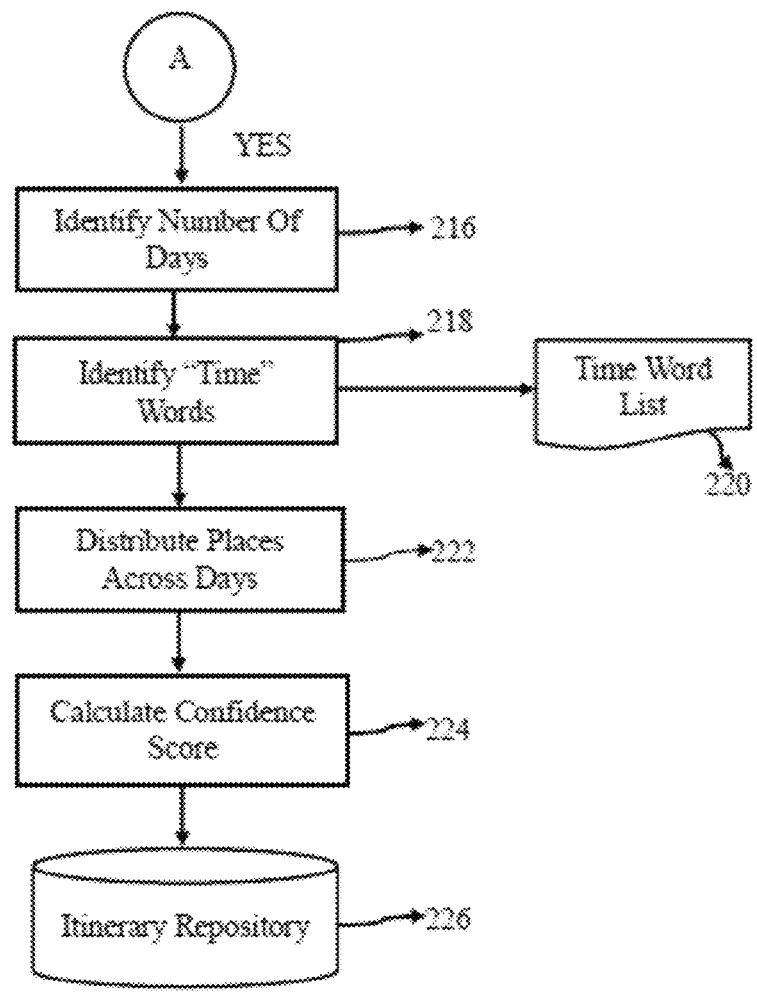

FIG. 2A and FIG. 2B jointly illustrates a flowchart explaining a method of extracting relevant travel related data from a web page, according to an embodiment herein. This system forms the most important aspect of the invention. The system starts its process by reading a list of URLs (Uniform Resource Locators) from various websites. These websites are chosen manually by a person based on the following two criteria. 1.) The website is publicly available for viewing and manipulation 2.) The website deals almost exclusively with the subject of travel, tourism, food, events and arts, 3.) The web sites are crawled and indexed by search engines like Google, Bing and Yahoo.

The extractor program (HTML page extractor), first parses the contents of a HTML page and reads the content (200). Unlike the other content parsers, this extractor program doesn't read the underlying HTML structure; rather it scans the text that makes up the page. Once the complete page has been read, the extractor starts identifying names of possible places (202). Places include but not limited to places of attractions, restaurants, clubs, bars and street names. The identification of a place name is dependent on a combination of heuristics decided by simple rules.

The first rule that the extractor applies is that any word that is capitalized or starts with a capital letter is likely to be a place. However, this has three main problems 1.) Words are capitalized at the beginning of a sentence, even though it might not be a place name. 2.) There are certain classes of words/phrases that are consistently capitalized even though they're not places—nationalities (Vietnamese, Indian), days of the week or months (Monday, March), travel technologies (GPS, Wi-Fi), directions (South-West, SW), eras (Bronze Age), schools of architecture (Art Noveau) etc. and 3.) Sometimes part of a place name will not be capitalized. Example, The Temple bar, Sunset Boulevard, etc. The extractor mitigates this problem by referring to a file on the server called a Place Name Block List 206. This Place Name Block List file 206 is a simple text file that lists, one term or phrase per line, words that the extractor can ignore and discard as a likely place name. For the purpose of illustration, a partial list of such terms is as follows: January, Jan, Indian, Aussie, Tassie, Sri Lankan, Indonesian, Street, Highway, Route, Boulevard, Stay, Pacific, GPS, Arctic, Atlantic, Mediterranean, This, That, His, We'll, She'll, He'll, We're, She's, Christian, Catholic, Christianity, Jewish, Jew, Hindu, Day ten, Day eleven, Day twelve, Travel, USD, Euro, Rupee, Pound. The Place Name Block File 206 itself is a dynamic entity. Words and phrases can be added and deleted as and when required for a particular set of HTML pages.

Once this step of referring to the Place Name Block List 206 is completed and narrowed a set of possible place names is determined (204). Then the process is moved to the next stage of identifying the place names and tagging them with geographical coordinates (208). Even with a narrowed set of place names, it is still not determined whether the narrowed set of place names are actual places that exist and qualify to be included in a possible itinerary.

The program puts the collected possible place names in a data store. This data store in turn is connected to large geographical databases 210 that contain hundreds of thousands of places of interest. For the purpose of this illustration, databases owned by Google Inc. and Foursquare Inc. are used. These databases 210 typically have a place name and an associated latitude and longitude. Using standard Application Programming Interfaces (API's), the program is run to connect the customer device to these databases and verifies whether the collected place names exist or not. If there is a match, the program is run to attaches the official name of the place (as provided by the Google and/or Foursquare databases) and stores it for future use.

In the next step, as referred by way of component numeral 212, the verified place name is determined to be relevant to the destination in question. This is important in many ways. Some places are mentioned in passing and do not belong to the itinerary. For example, a webpage might be about a trip to Australia but mention a woman in passing who lives in New York. A solution for such problems is to identify any place that is more than a set distance (say, 100 miles) from both its previous and next neighborhood place. Such places alone are considered outliers and eliminated or discarded (214).

To further this proof of absoluteness of a place, it is important to have strong confidence in what the main destination in the text is. For example, Cafe Flora exists in both Venice and Bangalore, and so it is important to know beforehand that the text is about a trip to Italy. To identify the main destination, the program scans the title, URL and the first few words of the webpage for destinations, and assumes them to be the main destination.

In a further refinement of a place and destination fit, the program eliminates any places that have been referenced in context of another. The most common method used to do this is to ignore the places that are preceded by words such as "near", "next to", "beside".

In yet another refinement, the program eliminates any places that have been just enumerated. For example, the author of the webpage may simply list all the places that are highlights of the trip at the outset before embarking on a detailed description. The solution to this problem is to find how proximate the various places that are disclosed in the webpage. If the text in the webpage is of sufficient length, the program calculates a "minimum distance" within which these places are in the article and all the mentioned places that violates/exceeds the preset distance is ignored.

The next step, as referred by way of component numeral 216, the program executes is to determine the number of days the trip lasts. This number of days of a visit is calculated by scanning the URL, title and the first two paragraphs of the page. Any number found in these areas followed by the words "days" or "weeks", is assumed to be the duration of the trip.

To recap, the program is run until now to read a webpage, extracted place names, refined the extracted place name list using a combination of heuristics and geographical databases, determine the relevancy of a place to the main destination and to calculate the duration of the trip.

The information gathered so far is displayed as a list, but for it to be a useful itinerary, it lacks the most defining characteristics of an itinerary, for example, place names, time ordered and distributed. This step is referred by way of component numeral 218.

The program is run to determine the itinerary in an order of time by once again resorting to heuristics and a reference file called the Time Word List, as referred by way of component numeral 220. This file contains the most common terms used to denote the time a place was visited. For example, a partial list of such terms follows: "hour", "hours", "hrs", "day", "days", "week". "weeks", "day", "morning", "night", "evening". "afternoon", "first", "second", "third", "fourth", "fifth", "sixth", "seventh", "eighth", "ninth", "tenth".

As the program is run to scan the page for determining the time of visit of each place, the Time Word List 220 is read and looks for the words in the page that match the list. This matching is done either for a singular term, such as, "morning" or "night" or for a combination of two or more terms like "fourth day" or "next evening".

Once such terms are identified, the program estimates whether the day or slot (e.g. morning, evening) is changed. For example, when the text describes a place visited in the morning for breakfast and then goes onto describe a place visited for lunch in the afternoon, and then the program estimates the approximate slot of each place—morning and afternoon (222).

At this step in the process, the program has verified all the places visited in the trip and arranged them in an order of time of visit. However, just the knowledge of time of visit of a particular place is not enough. In addition, it is important to know the order in which the places are visited and the days of visit. For example, assume a trip to New York is yielded the following places: two breakfast cafés, a museum, a church visit, a restaurant for lunch, two night clubs for entertainment, a theatrical show, two restaurants for dinner, and a children's park. The problem now is apparent—as listed above, there are two known places for certain categories of places. Since it is known that it is physically impossible to be in two different places (for breakfast, as an example), at the same time, the solution is to distribute these places across different days.

The data regarding the number of days is determined and the time slots of each place are known. The program is run to also know the instances of similar categories of places in the same time slot (as described above). The program is executed to finally begin the "assembly" process of arranging the places to be visited according to the time of visit and the days of visit.

Once this process is completed, a fully time ordered itinerary of a travel plan is generated. The itinerary, with its component places, is then stored in a database for future retrieval.

However, in order to make the itinerary to be of high relevance and quality, a confidence score is calculated (224). This confidence score is useful at the time of search and retrieval and is used as the default method of sorting and display.

In the final step, the program is run to retrieve the stored itinerary and to calculate a confidence score (224). The confidence score is a simple measure on a scale of 0 to 1. The closer to the figure of 1, the confidence score of an itinerary is, the better is the quality and subsequent chances of retrieval and display is higher. The confidence score is calculated as a series of elimination tests, in which each test deducts from the starting value of 1.

The first test is to determine, a period of each itinerary in terms of number of days using two different methods. If the yield, result of the two methods are not the same, the confidence score is deducted. The second test is to determine the number of places visited in each day. If the number is greater than twenty, or less than three, the confidence score is deducted. This is because if the number of places to be visited is more/high number, it is physically impossible to visit the estimated number of places because of logistics and transit issues. Similarly, when the number of places to be visited is very, it indicates that the day is not optimally and fully used in terms of time. The third test is to determine the total distance to be traveled in visiting the places mentioned in each day. When the distance exceeds 200 kilometers, the confidence score is deducted.

Once the confidence score is calculated, the value is stored against each itinerary in a database such as an itinerary repository 226.

As a final step in this process, the fully formed itinerary with the attached confidence score is stored in a database, as referred by way of component numeral 226, for further use.

Figure 3:
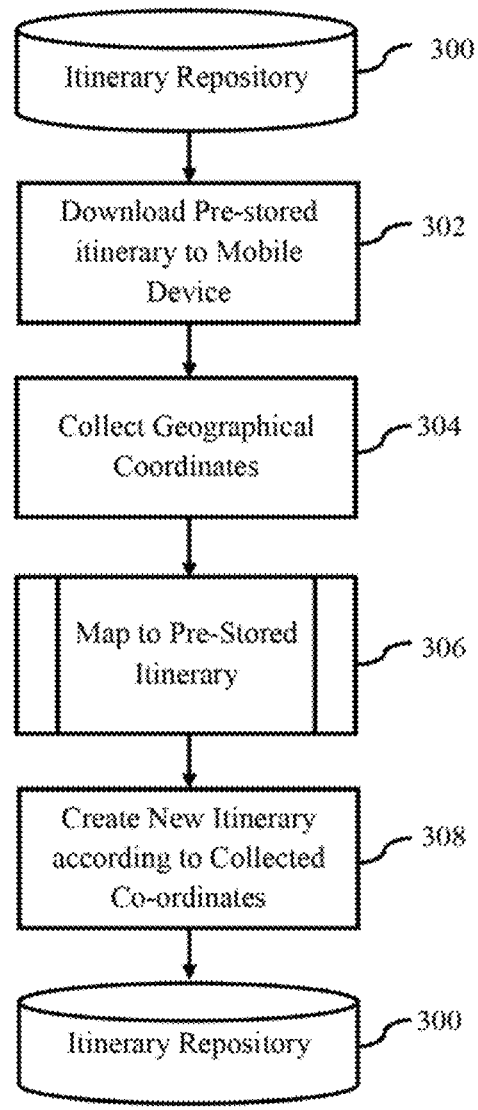
FIG. 3 illustrates a flowchart explaining a method of collecting geographical coordinates from a traveler and constructing a new itinerary, according to an embodiment herein.

FIG. 3 illustrates a flowchart explaining a method of collecting geographical coordinates from a traveler and constructing a new itinerary, according to an embodiment herein. This system forms the second most important aspect of the invention. This system allows for creating new dynamic itineraries based on a combination of pre-stored information and data collected by the transmission of place or location coordinates during a trip taken by a traveler.

As a first step, a traveler accesses the system (which is termed as Mygola® service) i.e. itinerary repository using either a mobile device or a desktop computer and creates a plan, as referred by way of component numeral 300. After finalizing the plan and before starting a trip, the traveler downloads a companion application from the service that contains his plan and other pre-stored data, to his mobile device (302). If the mobile device is equipped with a chip that transmits the location co-ordinates using a GPS system, the companion application asks for permission to record the same. The traveler begins his trip and starts visiting the places that are pre-loaded using the mobile device and companion application. When the traveler visits each pre-stored place, the application collects location data i.e. geographic co-ordinates of each place visited in the trip and stores it in its database (304). The application maps the collected geographic co-ordinates of the user visited place with the pre-stored itinerary (306).

If the traveler deviates from the pre-stored itinerary and visits other places not mentioned in the itinerary, the application stores the location coordinates of such places using the same technique of location data collection as mentioned above. After acquiring the permission of the traveler, the application transmits both the sets of stored location co-ordinates data (places already pre-stored with verified coordinates and new places visited out of turn) to the central repository of itineraries.

At this stage, the service module collates the newly transmitted data, modifies the collected and transmitted data to a uniform format common to all other stored itineraries and publishes the same as a new itinerary for future retrieval and display (308). The newly created itinerary is stored in the itinerary repository 300.

The various embodiments herein provide a method and system for creating a plausible, minute by minute plan for a traveler automatically and instantaneously. The method and system provides a plan that optimizes the travel routes and provides for maximum benefit when visiting a series of places. The method and system also allows the traveler to change a set of preferences that govern the original plan and get a refreshed and up-to-date minute plan that contains a list of places in proximity to the current location.

Figure 4:
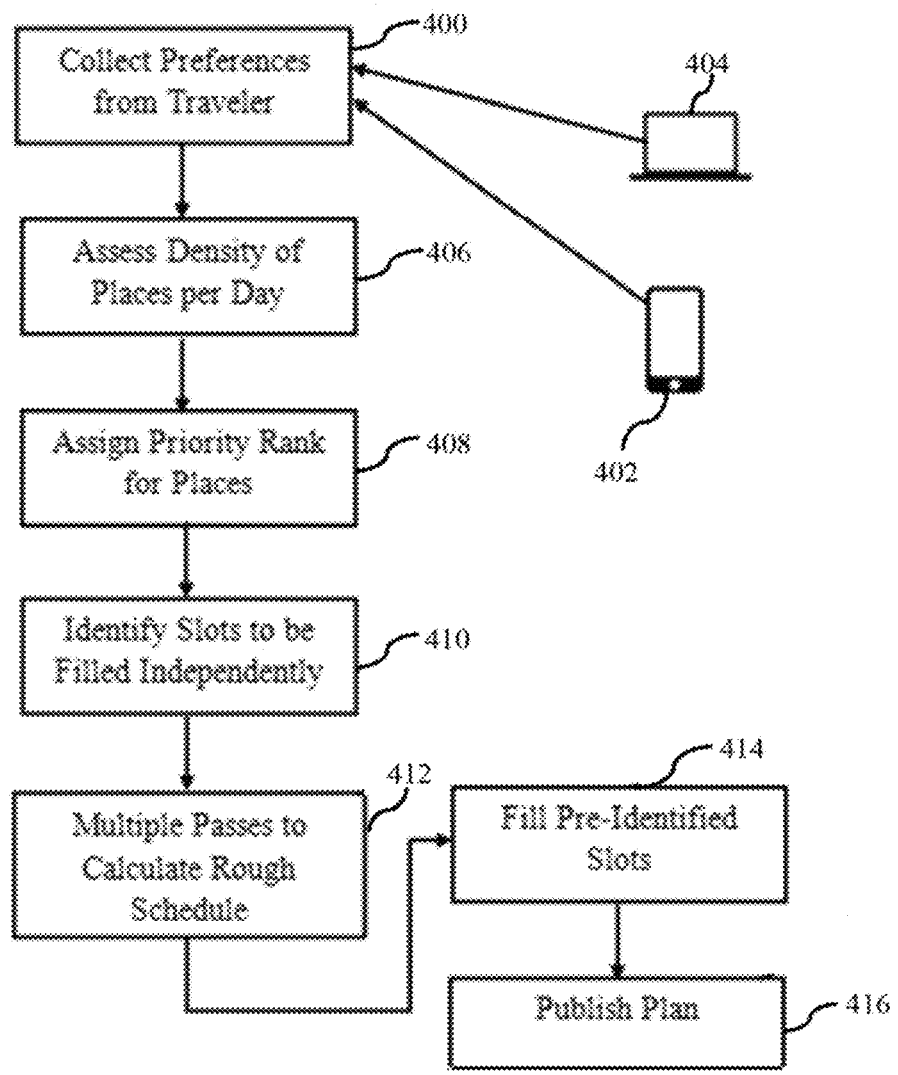
FIG. 4 illustrates a flowchart indicating a method of accepting the user preferences and calculating a plan of places to visit using the most optimum routes, according to an embodiment herein.

FIG. 4 illustrates a flowchart indicating a method of accepting user preferences and calculating a plan of places to be visited using the most optimum routes, according to an embodiment herein. As illustrated in FIG. 1, the system starts by collecting a set of preferences from a user (400). These preferences are captured by way of a web page residing on the "Mygola®" server 404 or by a mobile device 402. The page itself is accessed using a personal computer, a mobile phone or a tablet device. The page is constructed in such a manner that the page displays pictures and information regarding a place. For the purposes of illustration, a page that describes the Eiffel Tower is considered. The page is displayed with a picture of the tower, text matter describing the place, and with other metadata including but not limited to opening and closing hours, address, ticket purchasing information, public transportation details etc. Along with these details, two buttons—"maybe" and "definitely"—are provided for action. On pressing either of the buttons, the traveler's degree of interest in visiting the place is indicated.

In addition to the "maybe" and "definitely" preference, an additional set is collected. This includes, but not limited to details like the number of days a traveler intends to spend at the place, how intensely the trip needs to be packed, whether the travelers/visitors are travelling with kids, spouses, senior citizens and other specific requirements.

Once this data is collected, the system is moved to the next stage. The density of places, to be covered in a day, is calculated as indicated (406). The system takes in the preference of the user about how packed he/she wants the day to be. Using this preference, a numeric range of places that the traveler is able to visit in a day is calculated. For example, if the traveler has selected "intense" as a choice, then the numeric range is upper bound at ten places. However, if the traveler has chosen "light", then the range is upper bound at four.

At the next stage, each of the places that are selected during the preference gathering step is assigned a priority rank (408). The heuristics involved in ranking comprises a mix of variables. These include, but are not limited to the following: "maybe"/"definitely" the traveler has made, popularity of the place among the general population (gathered by way of, including but not limited to, total number of search queries on popular search engines, number of check-ins on location services like Foursquare etc;), attributes, including but not limited to "kid friendly", "romantic", "arty", "historical" etc. This ranked list of places is now stored in memory for further use in the optimization process.

The system moves onto the next stage, in which certain slots of the day are labeled and filled independently of the choices the traveler has exercised (410). Typically, these are an afternoon slot that coincides with lunch and an evening slot that coincides with dinner and stay for the night. But these types of slots are expanded to include events like concerts and exhibitions or other occasions that have a fixed schedule and deadline. For the afternoon slot (say, (12 noon to 2 pm), only places that are identified as restaurants, cafes and other places to eat are picked up and filled in. Similarly, for the night (say, post 9 pm), only places that are identified as hotels, guest houses and bed and breakfasts are filled.

The next step forms the most crucial stage of the whole process. It is here that the rough schedule is calculated and plotted against each available day (412). This is the basic plan on top of which modifications and additions are made either by the traveler or the system trying to optimize the entire plan. The whole process consists of multiple passes based on various parameters. The most critical of all these is the first pass. This is where an attempt is made to solve the travelling salesman problem with time windows. In essence, the whole process of scheduling is finding the most optimal routes between places that are nearest to each other, ordering them in accordance with the added constraint of time windows.

To solve this problem, the following parameters such as but not limited to are used as inputs: numeric range of places, the ranked list of places, places which are pre-slotted (hotels to stay, restaurants to eat at etc;), transit time between two random places and metadata about the chosen places (closing/opening hours of business, recommended time to be spent at each place). Another added input here is the default duration of visiting these places, in case there is no information regarding this in the collected metadata. For e.g. a restaurant visit is assigned 45 min, a monument or attraction is assigned 90 minutes. Further, a few fixed inputs are also assigned to the problem. The minimum transition time between any two places is taken as 15 minutes and a travelling speed is given as 15 kilometers per hour.

On the first pass, the top plans that score the highest by a combination of the least distance travelled and the inclusion of highest ranked places are selected for further refinement. In the second pass, these plans are taken and empty slots are identified. In these empty slots, places in close proximity to already existing places in the plan are filled in. This cycle repeats until a sufficient number of places are filled and the density desired by the user is achieved. If the slots still remain vacant or empty after these multiple passes, then these are identified and called out to the traveler who chooses to fill or ignores as per his/her wishes.

In the penultimate step of this plan, the slots that need to be filled with only a certain type of place are filled (414). For each pre-identified slot, the places in that category (e.g. cafes and restaurants during the lunch slot, nightclubs and bars during the evening) that are in close proximity to the previous and next place of visit are identified. This minimizes distance travelled and also respects the intensity of the plan chosen.

Once all these stages are completed, the plan is marked as final and published to a repository (416).

Figure 5:
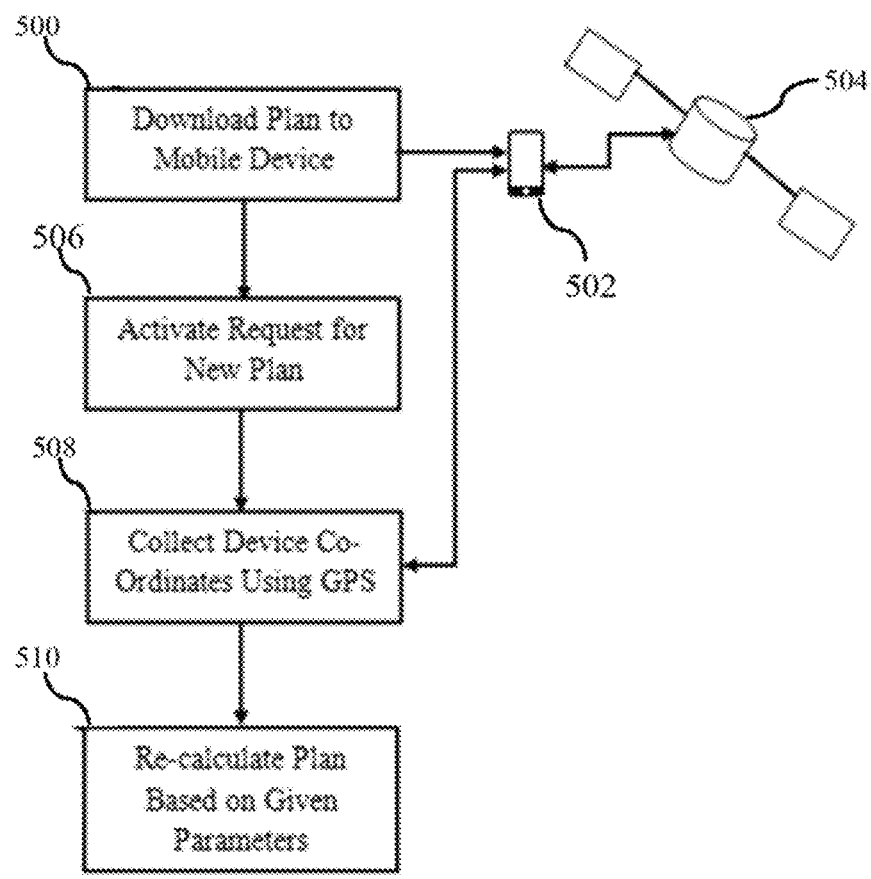
FIG. 5 illustrates a flowchart indicating a method of accepting a fresh set of preferences from a traveler, using the stored locations of places visited and recalculating the plan so as to include new places of visit in proximity to the traveler's location, according to an embodiment herein.

FIG. 5 illustrates a flowchart indicating a method of accepting a fresh set of preferences from a traveler, using stored locations of places visited and recalculating the plan so as to include new places to visit in proximity to the traveler's location, according to an embodiment herein. This system allows for creating dynamically modified plans based on a combination of pre-stored information and data collected by the transmission of place coordinates during a trip taken by a traveler.

As a first step, a traveler accesses the system ("Mygola®" service) and downloads a travel plan using a mobile device (500). If the mobile device 502 is equipped with a chip that transmits the location co-ordinates using a GPS system 504, the application asks for permission to record the same. The traveler begins his trip and starts visiting the places that are pre-loaded using the mobile device and application. At each pre-stored place visited by the traveler, the application collects location co-ordinates data and stores the same in a database.

If the traveler desires to change the travel plan from the original travel plan that is downloaded either he/she does not wishes to follow the plan or the places suggested are not visited due to some external circumstances, then the traveler submits a request to the service to this effect, (506). The system then picks up the location coordinates of the places already visited, using GPS functionality present in the mobile device (508). It also then collects a set of preferences, including but not limited to, types of places to be visited, rate of intensity of the rest of the day in terms of activities and duration of the day the traveler wishes to spend visiting.

Once these details are captured, the system recalculates the plan using the above data (510). While doing so, the system also takes into respects time slots, proximity of places to be visited from present location and available transit options between the places.

Figure 6:
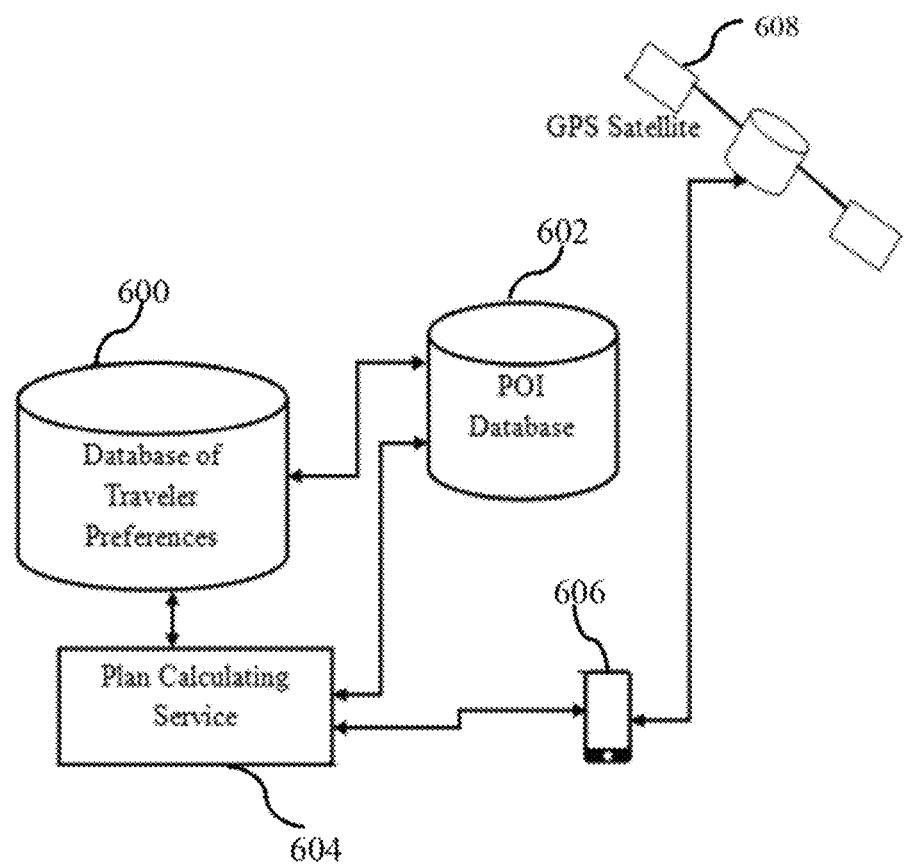
FIG. 6 illustrates a functional block diagram of a system for accepting user preferences, calculating an optimum plan, downloading it the mobile device and allowing the user to make the changes to the existing plan based on his/her current location, according to an embodiment herein.

FIG. 6 illustrates a functional block diagram of a system for accepting user preferences, calculating and downloading an optimum plan to the mobile device, and allowing the user to make changes to the existing plan based on his/her current location, according to an embodiment herein. The system comprises a database of traveler preferences 600 chosen by the traveler, places of interest database 602, a plan calculating service module 604, a mobile device equipped with a GPS chip 606 and Global Positioning Satellite 608.

The system first accepts and stores the preferences including but not limited to, intensity of trip, a possible list of places, number of days to be spent from the traveler in a database of preferences 600. These lists of places are saved in the POI database 602 that contains a list of places of interest. Once the user indicates that his/her wishes to see the plan that is generated, the system draws up a list of places to be visited in a sequential order, using the plan calculating service module 604. This calculating process is done by solving a variation of the travelling salesman problem with time windows.

Once a basic plan is made, the generated basic travel plan is downloaded to the traveler's mobile device 606, for use. During the travelling, the mobile device 606 records the location co-ordinates of the places visited using the inbuilt GPS chip. If, by any chance, the traveler wishes to deviate from the pre-stored original travel plan, the system recalculates the plan based on a new set of preferences indicated by the user. This plan takes into account places already visited, and other places that are not a part of the original plan but are in close proximity to the traveler and satisfying all the conditions exercised in the preferences. Once a new plan is calculated, the generated new travel plan is transmitted back to the traveler's mobile device 606.

The foregoing description of the specific embodiments herein will so fully reveal the general nature of the embodiments herein that others can, by applying current knowledge, readily modify and/or adapt for various applications such specific embodiments herein without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of the preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the embodiments herein with modifications. However, all such modifications are deemed to be within the scope of the claims.

It is also to be understood that the following claims are intended to cover all the generic and specific features of the embodiments described herein and all the statements of the scope of the embodiments which as a matter of language might be said to fall there between.

What is claimed is:

1. A system for dynamic travel plan management, the system comprises:
   a point of travel interest database, storing travel related plain text articles extracted from a plurality of sources, the plurality of sources are selected from a group consisting of web portals, social networking websites and tourism websites, and wherein the travel related plain text articles are transformed into a time ordered list of places to be visited;
   an article extraction module for extracting a plurality of articles by using a combination of word exclusion lists and heuristics identified in text entities;
   a place verification module for verifying a geographical location of a plurality of places of visit, included in the extracted plurality of articles and wherein the plurality of places of visit are included in a travel plan, by using a combination of word exclusion lists and the travel related plain text articles in the point of travel interest database;
   an application server for generating the travel plan based on a set of preferences set by the user; and
   a user device pre-installed with a mobile application, and wherein the user mobile device is connected to the application server to download the travel plan.

2. The system according to claim 1, wherein the user device is a computing device selected from a group consisting of a desktop computer, a laptop computer, a palm top computer, a GPS enabled mobile phone device, and a tablet device.

3. The system according to claim 1 further comprises a preference storage module for storing the set of preferences set by the user, and wherein the set of preferences comprises number of days, intensity of activities, and a preferred set of places to be visited, and wherein the preferred set of places to be visited is collected from the user.

4. The system according to claim 1, wherein the application server comprises a plan calculation module for calculating a travel plan based on the set of preferences set by the user.

5. The system according to claim 1, wherein the application server receives data from the article extraction module and the place verification module for constructing the travel plan.

6. The system according to claim 1, wherein the mobile application installed in the user mobile device is run to retrieve and record a location of the user and co-ordinates of the location of the user in real time by using an inbuilt GPS chip in the user mobile device, and wherein the mobile application is run to transmit the recorded location of the user and the coordinates of the location of the user to the application server for calculating a deviation from the downloaded travel plan.

7. The system according to claim 1, wherein the application server modifies the generated plan to generate a revised travel plan based on the location of the user and co-ordinates of the location, when the deviation from the generated travel plan is detected.

8. A method for dynamic travel plan management, the method comprises:
   extracting, using an article extraction module, one or more travel related plain text articles from one or more web portals;
   storing extracted travel related plain text articles in a point of travel interest database;
   receiving a set of preferences from a user and storing the set of preferences in a preference storage module;
   extracting, using the article extraction module, a plurality of articles from the travel related plain text articles by using a combination of word exclusion lists and heuristics identified in text entities;
   verifying, using a place verification module, the extracted plurality of articles with respect to one or more places of visit to be included in a travel plan;

generating, using an application server, a travel plan based on the set of preferences received from the user and the one or more place of visit; and downloading the travel plan to the user mobile device pre-installed with a mobile application.

9. The method according to claim 8, further comprises choosing a number of places to be visited in a day by the application server.

10. The method according to claim 9, wherein each chosen place is assigned with a rank of priority for a final selection and sorting.

11. The method according, to claim 8, further comprises identifying a preset period of day and slots in the travel plan for visiting a specific type of places, and wherein the slots for visiting the preset types of places are identified and selected based on a proximity of the preset type of places with the number of places of visit selected for visiting in a given day.

12. The method according to claim 8, further comprises checking the places to be visited in a single day or the given day based on the rank assigned to the set of places, distance of places with respect to the selected places of visit in the given day and a transit time between any two places of visit to generate a travel plan by the application server.

13. The method according to claim 8, wherein the user modifies the generated and downloaded travel plan by selecting a fresh set of preferences and options, based on actual places visited and a remaining time and places to be visited in the given day.

14. The method according to claim 8, wherein the application server modifies the generated travel plan to generate a revised travel plan to include new places of visit based on the present location of the user and proximity of new places not visited and not included in the downloaded travel plan, and wherein the revised travel plan is downloaded to the user mobile device in real time.

* * * * *